United States Patent
Smith

[11] 3,844,639
[45] Oct. 29, 1974

[54] CONVERTER LENS

[75] Inventor: Tom F. Smith, Urbana, Mo.

[73] Assignee: United States T.R.A.D. Corporation, Springfield, Mo.

[22] Filed: Dec. 11, 1972

[21] Appl. No.: 313,836

[52] U.S. Cl............. 350/181, 350/190, 352/69, 352/236
[51] Int. Cl. .......................................... G03b 21/38
[58] Field of Search ...... 352/69, 236; 350/181, 188, 350/190

[56] References Cited
UNITED STATES PATENTS

| | | | |
|---|---|---|---|
| 2,288,143 | 6/1942 | Sheppard | 350/188 X |
| 2,702,493 | 2/1955 | Knowlton | 350/181 |
| 3,039,349 | 6/1962 | Rodgers | 350/276 SL |
| 3,143,033 | 8/1964 | Shearer | 352/239 X |
| 3,165,969 | 1/1965 | Gunn | 352/69 X |

OTHER PUBLICATIONS

"International Projectionist" Aug. 1955, pp. 8, 11, 12, 34.

*Primary Examiner*—Monroe H. Hayes
*Attorney, Agent, or Firm*—Lowe, Kokjer, Kircher, et al.

[57] ABSTRACT

A converter lens is used with a motion picture film having an image with an anamorphic distortion thereon. The lens has a convex surface adjacent the film that is approximately the same width as the width of the image being carried on the film and also includes a concave surface on the opposite side thereof. The focal length of the lens is designed to reduce the less distorted direction of the anamorphically distorted image to obtain substantially the same degree of distortion in each of the perpendicular directions. Upon having the lens, an undistorted image is produced.

1 Claim, 5 Drawing Figures

PATENTED OCT 29 1974  3,844,639

CONVERTER LENS

BACKGROUND AND BRIEF DESCRIPTION OF THE INVENTION

During the past several years the motion picture industry has been producing a large number of motion picture films having anamorphically distorted images thereon. There have been several aspect ratios (the ratio of the width to the height of the distorted image) used, such as 2.0/1.0 and 1.85/1.0. Since an image that is wider than a "standard" image is framed on the film, it is necessary to have wider motion picture screens for receiving pictures projected thereon. Thus, the industry is faced with the problem that when a screen cannot be enlarged, some method must be provided to allow the distorted motion picture to be projected on the "normal" sized screen. Frequently this is accomplished by masking out areas of the motion picture film so that these areas of the film are not projected on the screen or shown to the viewing public.

From the above discussion of aspect ratios and the size of frame used for the images, a significant result is seen. For example, the height of the image is the same for each distortion ratio because of the framing size and this height is the lesser distorted of the two perpendicular directions. Accordingly, an image having a correct aspect ratio is created by increasing the distortion of the projecting image (optically squeezing the image) in the direction originally having the lesser distortion. This corrected image may then be projected through a "standard" projector lens to a "normal" sized screen without the necessity of masking thereby permitting standard sized screens to be used even with the now popular CinemaScope anamorphic film.

One of the primary objects of this invention is to provide a unique converter lens that will allow an anamorphically distorted image to be projected upon a "normal" sized motion picture screen. It is a feature that this image projection is accomplished without the necessity of masking out portions of the film.

A further object of this invention is to provide a method of using a unique converter lens to convert an anamorphically distorted image to a non-anamorphically distorted image, said method including the steps of positioning an anamorphically distorted image ahead of a light source, determining which of the two perpendicular directions of distortion has a lesser degree of distortion, distorting the image in the direction of the lesser degree to obtain a corrected image having the same degree of magnification, and projecting the corrected image onto a predetermined surface.

A further object of this invention is to provide a converter lens uniquely designed so that the motion picture screen provides an element of the design criteria. In this manner screen enlargement is not necessary to accommodate modern motion picture films.

A further object of the invention is to provide a unique lens for use with anamorphic film that distorts the lesser distorted perpendicular direction and causing a resultant image having essentially the same magnification in either distortion direction.

Another object of this invention is to provide a unique anamorphic converter lens that will prevent dispersion of the associated projector's light upon image transmission through the lens.

As a further object of this invention an anamorphic converter lens is provided of the character described that will transmit an image through the lens and simultaneously remove side reflection of irradiant light within the lens.

A still further object of this invention is to provide a unique anamorphic converter lens that will transmit an image and prevent color distortion of the image when projected upon the desired surface.

These and other objects of the invention, together with the features of novelty appurtenant thereto, will appear in the course of the following description.

DETAILED DESCRIPTION OF THE INVENTION

In the accompanying drawings which form a part of this application and are to be read in conjunction therewith, and in which like reference numerals are employed to indicate like parts in various views.

Figure 1:
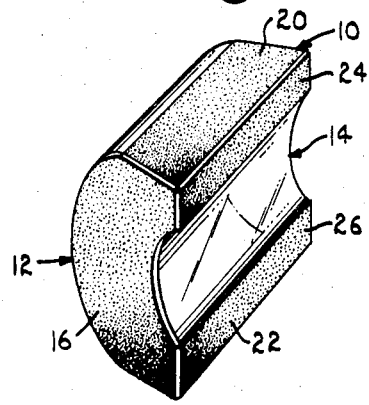
FIG. 1 is a perspective view showing one form of a lens structure embodying the invention.

Referring now to the drawings and more particularly to FIG. 1 thereof, a unitary cylindrical lens 10 for converting an anamorphically distorted image to an image having virtually no distortion is shown. The lens 10 is fabricated from conventional material with good optical properties and has a convex surface 12 and a concave surface 14.

The concave side of lens 10 (FIG. 2) is shown to be in the general shape of a rectangle and extending transverse to the light emission axis 52. Each flat rectangular area 24 and 26 is circumscribed by inside edge 28, outside edge 30, and transverse edges 32 and 34. Inside edge 28 is substantially parallel to outside edge 30, while transverse edge 32 is substantially parallel with transverse edge 34. Also transverse edge 32 is substantially perpendicular to both inside edge 28 and outside edge 30. Edges 28 of flat areas 24 and 26 are contiguously interconnected through concave surface 14 as suggested above.

Figure 2:
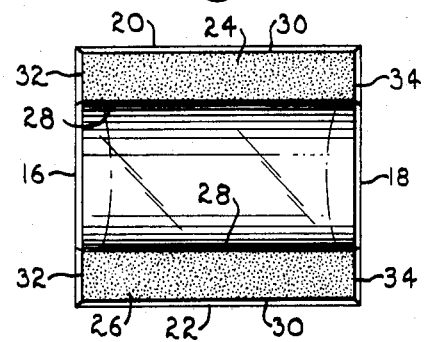
FIG. 2 is an elevational view from the concave side of the lens structure with certain portions of the lens being shown as frosted.
Figure 3:
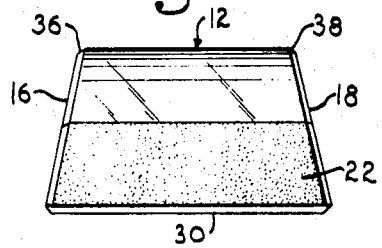
FIG. 3 is a bottom plan view of the lens shown as FIG. 2 with certain areas of the lens being shown as frosted.

As shown in FIGS. 1–3 the top and bottom flat surfaces 20 and 22 respectively are connected to and extend substantially perpendicular to flat forward surfaces 24 and 26. The side surfaces 16 and 18 converge inwardly from front to rear joining surfaces 16 and 18 converge inwardly from front to rear joining surfaces 24 and 26 and the concave surface 14 with the convex surface 12 and with top and bottom surfaces 20 and 22. The inward sloping of the sides 16 and 18 is constructed so that at the extreme points 36 and 38 (see FIG. 3) where sides 16 and 18 meet with the outermost edge of convex surface 12, the distance between sides 16 and 18 is approximately the same width as a frame of motion picture film being projected. Sides 16, 18, 20, 22 and flat areas 24 and 26 of lens 10 have been etched to provide a frosting along said sides and front areas. This frosted condition prevents passage of irradiant light from outside sources. Thus, the only passage of light through lens 10 will be the passage of light from convex surface 12 to concave surface 14. Since the distance between points 36 and 38 is the same width as a frame on motion picture film, the only light projected through lens 10 will be that light being transmitted through motion picture film 40 (FIGS. 4 and 5).

Figure 4:
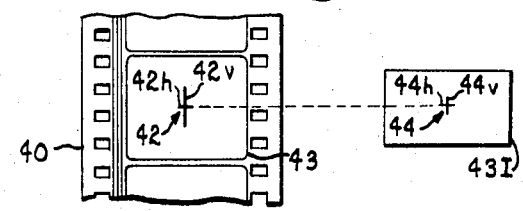
FIG. 4 is an illustration of a motion picture film having an anamorphically distorted image imposed thereon with the subsequent conversion of the image prior to projection through a projector's lens.
Figure 5:
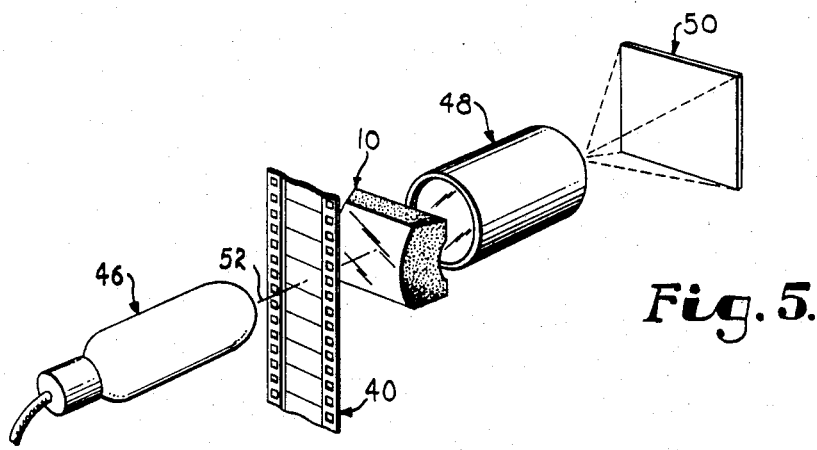
FIG. 5 schematically illustrates the positioning of the converter lens in relation to the other operational features of a motion picture projector.

FIG. 4 is used to illustrate the conceptual approach for constructing lens 10. An anamorphically distorted image 42 is positioned in a frame 43 of film 40. The greater distorted direction image 42 is in the horizontal direction (transverse to the direction of movement of film 40) and is indicated by the numeral 42H. At the same time, numeral 42V refers to the vertical image component (in the direction of movement of film 40) and represents the less distorted direction. Should frame 43 be seen through lens 10, it may be viewed as shown at 43I with a corrected image 44 positioned therein. Lens 10 is constructed and positioned to increase the distortion of image 42 in the vertical direction in order to obtain an equal magnification of all components of the projected image.

In operation (see FIG. 5), a film 40 is operatively located with respect to light source 46 and has an anamorphic distorted image 42 passing between light 46 and the above described lens 10. As the light passes through lens 10 the distortion of the lesser distorted direction is increased to such an extent as to correct the image to the same relative degree of magnification as that in the other perpendicular direction of distortion. Since the image is now a corrected image 44, image 44 is projected through the conventional projection lens 48 to a motion picture screen 50.

By correcting image 42 to the corrected image 44, the width of the motion picture screen does not have to be changed as is generally the case with CinemaScope type film projection. The positioning of lens 10 relative to motion picture film 40 is such that convex side 12 will face and be in close proximity to film 40. Also, cylindrical lens 10 is positioned with its axis of curvature being substantially parallel to the greater degree of distortion of image 42. That is, the axis of curvature is perpendicular to the direction of movement of the motion picture film 40.

Although converter lens 10 was described as being used in a motion picture projector in conjunction with a motion picture screen, it could be used equally well in converting an anamorphically distorted picture for use in the television industry. Accordingly, instead of projection lens 48 projecting onto motion picture screen 50, the corrected image 44 could be projected upon a television camera, thus allowing a corrected image to be broadcast to the television viewer.

From the foregoing, it will be seen that this invention is one well adapted to attain all the ends and objects herein set forth, together with other advantages which are obvious and which are inherent to the structure.

It will be understood that certain features and subcombinations are of utility and may be employed to other features and subcombinations. This is contemplated by, and is within the scope of the claims.

As many as possible embodiments of the invention may be made without parting from the scope thereof, it is to be understood that all matter herein set forth or shown in the accompanying drawings is to be interpreted as illustrative and not in a limiting sense.

Having thus described my invention, I claim:

1. A converter lens for use with film having an anamorphically distorted image thereon, said lens comprising:

a first side having an outward curvature to define a convex surface;

a second side opposite said first side, the upper and lower portions of said second side forming flat surfaces, said second side having an inward curvature between said upper and lower portions to define a concave surface therebetween;

a pair of opposite ends interconnecting said first and second sides, said opposite ends defining flat surfaces angling outwardly from said first side to said second side; and top and bottom surfaces interconnecting said first and second sides and said opposite ends.

* * * * *